(12) United States Patent
Maretic et al.

(10) Patent No.: US 11,023,457 B1
(45) Date of Patent: Jun. 1, 2021

(54) TARGETED SWEEP METHOD FOR KEY-VALUE DATA STORAGE

(71) Applicant: Palantir Technologies Inc., Palo Alto, CA (US)

(72) Inventors: Grgur Petric Maretic, London (GB); James Baker, London (GB); Nathan Ziebart, Germantown, TN (US); Sandor Van Wassenhove, London (GB)

(73) Assignee: Palantir Technologies Inc., Denver, CO (US)

( * ) Notice: Subject to any disclaimer, the term of this patent is extended or adjusted under 35 U.S.C. 154(b) by 108 days.

(21) Appl. No.: 16/287,525

(22) Filed: Feb. 27, 2019

Related U.S. Application Data

(60) Provisional application No. 62/748,133, filed on Oct. 19, 2018.

(51) Int. Cl.
*G06F 7/00* (2006.01)
*G06F 16/23* (2019.01)
*G06F 16/21* (2019.01)
*G06F 16/2455* (2019.01)

(52) U.S. Cl.
CPC ........ *G06F 16/2379* (2019.01); *G06F 16/219* (2019.01); *G06F 16/2322* (2019.01); *G06F 16/2329* (2019.01); *G06F 16/2365* (2019.01); *G06F 16/24554* (2019.01)

(58) Field of Classification Search
CPC ............. G06F 16/2379; G06F 16/2329; G06F 16/219; G06F 16/2322; G06F 16/24554; G06F 16/2365
USPC .......................................... 707/600–899, 695
See application file for complete search history.

(56) References Cited

U.S. PATENT DOCUMENTS

2019/0303024 A1\* 10/2019 Iwai ...................... G06F 3/0679

\* cited by examiner

*Primary Examiner* — Isaac M Woo
(74) *Attorney, Agent, or Firm* — Sheppard Mullin Richter & Hampton LLP

(57) ABSTRACT

A computer-implemented method for targeted sweep of a key-value data storage is provided. The method comprises before a write transaction to a database having a key value store commits, and before each of one or more write commands of the write transaction are persisted to the key value store, writing an entry for each of the one or more write commands to an end of a targeted sweep queue, the entry comprising metadata including: data identifying a cell to which the write command relates, a start timestamp of the write transaction, and information identifying a type of the write transaction.

20 Claims, 7 Drawing Sheets

FIG. 7

| (coarse partition timestamp, strategy, shard number) | fine partition timestamps | | | |
|---|---|---|---|---|
| (0, conservative, 3) | 0 | 1 | 4 | 5 | 7 |
| (0, conservative, 2) | 2 | | | |
| (0, thorough, 1) | 1 | 3 | 6 | |

FIG. 8

| (strategy, shard number) | Timestamp last swept to |
|---|---|
| (conservative, 3) | 100 |
| (conservative, 2) | 1000 |
| (thorough, 1) | |

TARGETED SWEEP METHOD FOR KEY-VALUE DATA STORAGE

CROSS REFERENCE TO RELATED APPLICATIONS

This application claims the benefit under 35 U.S.C. § 119(e) of U.S. Provisional Application Ser. No. 62/748,133 filed Oct. 19, 2018, the content of which is incorporated by reference in its entirety into the present disclosure.

TECHNICAL FIELD

Example embodiments relate to methods and systems for a sweep method for data storage. Example embodiments relate to a targeted sweep method for a key-value store, and a data processing apparatus (the apparatus comprising one or more processors or special-purpose computing hardware) and a data processing system configured to carry out the method. Example embodiments also relate to a computer program, optionally stored on a computable-readable medium, the computer program comprising instructions which when executed by a computer cause the computer to carry out the method.

BACKGROUND

A database is an organized collection of data which is stored and may be accessed electronically. Databases are used in virtually every commercial sector to store, organise and manage data relating to, for example, technical processes, data analysis and transformation processes, financial transactions and inventory management, to give a very limited number of examples.

Databases may be classified based on how they store data and/or how they are managed. Example classifications which are well-known are relational databases and non-relational (e.g. NoSQL) databases. Non-relational databases tend to be the preferred class where scalability and distribution of database storage nodes on multiple computer systems is needed. Such scalability and provision of distributed storage are factors that many modern database users require, particularly where databases hold large amounts of data which increase over time.

Another feature that modern database users require is transactional functionality. A transactional database is one that has the capability to roll-back or undo a requested database transaction if it is not completed correctly. There is usually logged a start timestamp, indicating when a transaction starts (e.g. a write operation), and, if there are no errors, an associated commit timestamp, indicating when the transaction has occurred (e.g. the write operation has succeeded). This enables transactions to be rolled-back if an error occurs, and the relevant operation does not persist to the database.

One type of NoSQL database is a key-value store, or key-value, type database, which uses an associative array (otherwise known as a map or a dictionary) as the underlying data model. The associative array comprises a collection of (key, value) pairs, where each key appears at most once within the collection. By referencing the key, pairs can be added or removed from the collection and the value of each pair can be modified. Values can also be looked up using the associated key. The value can represent different data types or different fields, which allows for a more flexible database to be provided, since no placeholders are needed for optional values. Key-value databases can therefore require less memory and so improve database performance, particularly in big-data and real time applications.

When new transactions are persisted to the key-value database, such databases often maintain historical versions of cells that have been written to. This approach can help to ensure that database consistency is eventually achieved across all the database storage nodes (or more simply, nodes) on the multiple computer systems. However, these historical cell versions take up storage space in the underlying key-value store and, because read operations for the key-value database require scanning over all the obsolete historic versions of each cell, can lead to significant performance degradation over time.

Database performance can be improved by removing historical cell versions from the key-value store of the database. One approach to managing or removing historical versions of cells from a database comprises a "sweep" method, which iterates over part of a key-value store of a database searching for historical cell versions which can be safely deleted. However, previous sweep approaches can be slow, and sweep performance may degrade over time, particularly if the size of the database increases.

It is therefore desirable to obviate one or more issues associated with such databases.

SUMMARY

Various embodiments of the present disclosure may include systems, methods, and non-transitory computer readable media configured to provide a sweep method for managing historical versions of cells in a database. In one embodiment, the present disclosure provides a computer-implemented method comprising writing an entry for each of one or more write commands of a write transaction to an end of a targeted sweep queue in a database having a key value store, the entry comprising metadata including: data identifying a cell to which the write command relates, a start timestamp of the write transaction, and information identifying a type of the write transaction; and performing a targeted sweep of the database by: starting from a start of the targeted sweep queue, selecting an entry from the targeted sweep queue based on a current sweep timestamp; and using a single ranged tombstone to delete prior versions of a cell to which a write command of the entry relates.

In some embodiments, the method further comprises deleting the selected entry from the targeted sweep queue and selecting a next entry from the targeted sweep queue.

In some embodiments, the method further comprises committing the write transaction to the database and persisting each of the one or more write commands to the key value store.

In some embodiments, performing a targeted sweep comprises: checking a commit timestamp of a write transaction associated with the write command of the entry; and if the write transaction is not committed: aborting the transaction, deleting the write from the key value store, popping the entry from the targeted sweep queue, and selecting a next entry from the targeted sweep queue.

In some embodiments, performing a targeted sweep comprises: checking a commit timestamp of a write transaction associated with the write command of the entry; and if the commit timestamp is greater than or equal to the sweep timestamp, pausing the targeted sweep.

In some embodiments, the method further comprises performing a targeted sweep comprises: checking a commit timestamp of a write transaction associated with the write command of the entry; and if the commit timestamp is less than the sweep timestamp, using the single ranged tombstone to delete prior versions of the cell.

In some embodiments, the method further comprises a strategy of the targeted sweep comprises a conservative strategy and performing a targeted sweep having a conservative strategy comprises: writing a deletion sentinel; and using the single ranged tombstone to delete all prior versions of the cell without deleting the deletion sentinel or the write.

In some embodiments, a strategy of the targeted sweep comprises a thorough strategy and performing a targeted sweep having a thorough strategy comprises: if the write command of the entry is a tombstone: using the single ranged tombstone to delete all prior versions of the cell including any existing deletion sentinel and the write.

In some embodiments, a strategy of the targeted sweep comprises a thorough strategy and performing a targeted sweep having a thorough strategy comprises: if the write command of the entry is not a tombstone: using the single ranged tombstone to delete all prior versions of the cell including any existing deletion sentinel without deleting the write.

In some embodiments, performing a targeted sweep further comprises: when the current sweep timestamp is greater than a start timestamp of the entry, using the single ranged tombstone to delete prior versions of the cell.

In some embodiments, performing a targeted sweep further comprises: when the current sweep timestamp is less than or equal to the start timestamp of the entry, pausing the targeted sweep.

In some embodiments, selecting an entry from the targeted sweep queue comprises: selecting a stored sweep progress timestamp; identifying a batch of entries from the targeted sweep queue having a start timestamp greater than the stored sweep progress timestamp and a start timestamp less than the current sweep timestamp; partitioning the entries from the identified batch of entries based on a cell to which a write command of each entry relates; and for each partition: determining an entry having the greatest start timestamp of write transactions to the cell, and determining the single ranged tombstone based on the greatest start timestamp. In some embodiments, the method further comprises, after performing the targeted sweep process, updating the stored sweep progress timestamp.

In some embodiments, the sweep timestamp is the lower of: a start timestamp of a longest running write transaction and an earliest readable time.

In some embodiments, writing an entry for each of the one or more write commands to a back of a targeted sweep queue comprises: partitioning a list of the entries in dependence on one or more parameters of a pre-defined targeted sweep strategy; storing, as sweepable timestamp data of the targeted sweep queue, a fine partition timestamp derived from the start timestamp of the write transaction, the fine partition timestamp indexed by the one or more parameters and by a coarse partition timestamp derived from the start timestamp of the write transaction; storing as sweepable cell data of the targeted sweep queue, for each entry within the partition, the metadata for the entry, the metadata indexed by the one or more parameters and by the fine partition timestamp. In some embodiments, the fine partition timestamp comprises an integer division of the start timestamp by a first pre-determined value. In some embodiments, the coarse partition timestamp comprises an integer division of the start timestamp by a second pre-determined value, the second pre-determined value greater than the first pre-determined value.

In some embodiments, the one or more parameters comprise at least one of: a shard number, and a strategy of the targeted sweep. In some embodiments, the method further comprises for each write command, determining the shard number from a hash of the data identifying the cell.

Also provided, in one embodiment, is a non-transitory computer-readable storage medium including instructions that, when executed by at least one processor of a computing system, cause the computing system to perform a method comprising: writing an entry for each of one or more write commands of a write transaction to an end of a targeted sweep queue in a database having a key value store, the entry comprising metadata including: data identifying a cell to which the write command relates, a start timestamp of the write transaction, and information identifying a type of the write transaction; and performing a targeted sweep of the database by: starting from a start of the targeted sweep queue, selecting an entry from the targeted sweep queue based on a current sweep timestamp; and using a single ranged tombstone to delete prior versions of a cell to which a write command of the entry relates.

In another embodiment, provided is a system comprising one or more physical processors; a memory storing instructions that, when executed by the one or more physical processors, cause the system to: write an entry for each of one or more write commands of a write transaction to an end of a targeted sweep queue in a database having a key value store, the entry comprising metadata including: data identifying a cell to which the write command relates, a start timestamp of the write transaction, and information identifying a type of the write transaction; and perform a targeted sweep of the database by: starting from a start of the targeted sweep queue, selecting an entry from the targeted sweep queue based on a current sweep timestamp; and using a single ranged tombstone to delete prior versions of a cell to which a write command of the entry relates.

BRIEF DESCRIPTION OF DRAWINGS

Example embodiments will now be described, by way of non-limiting example, with reference to the accompanying drawings.

FIG. 7 is a schematic illustration of a part of a targeted sweep queue of an example embodiment;

FIG. 8 is a schematic illustration of a data which may form part of a targeted sweep queue in some example embodiments;

DETAILED DESCRIPTION

Figure 1:
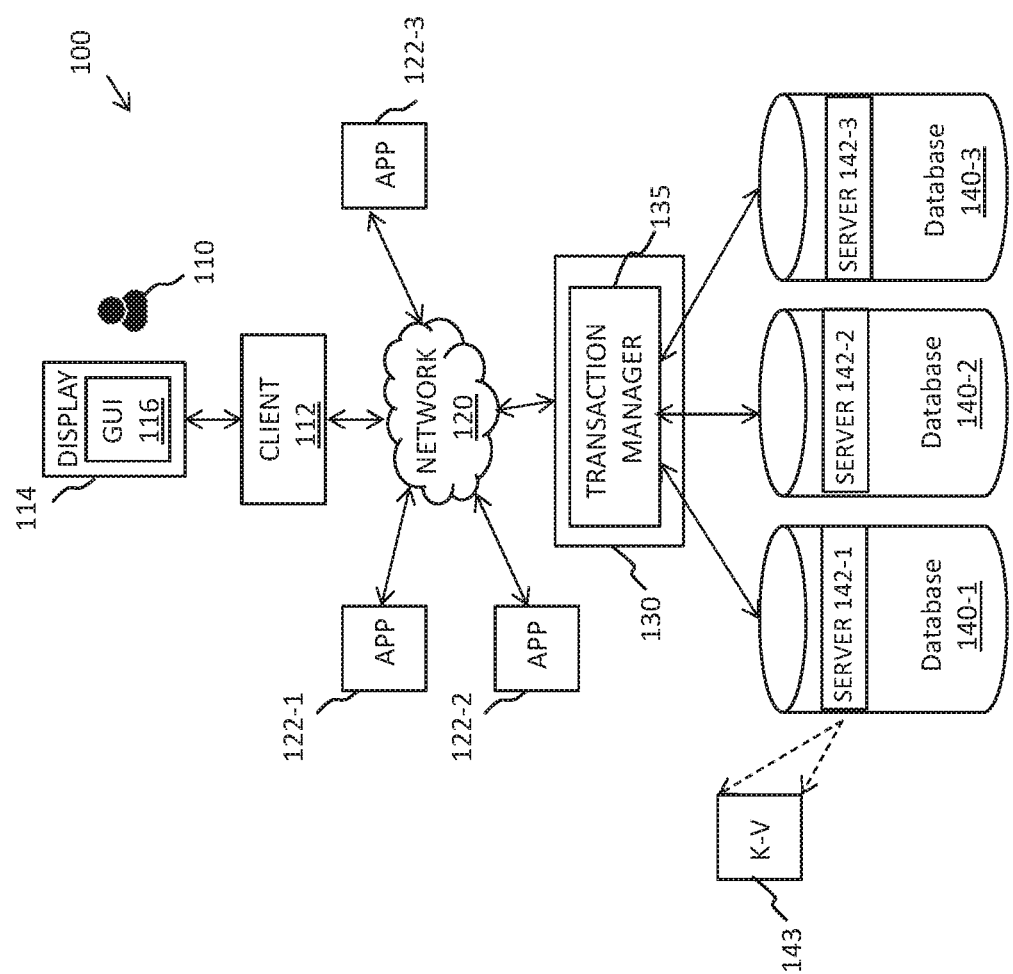
FIG. 1 is a block diagram of a computer network incorporating a computer system for operating according to an example embodiment.

Example embodiments will be described for carrying out the subject matter of the present disclosure. In the following description, specific details are set forth in order to provide a thorough understanding of the subject matter. It shall be appreciated that embodiments may be practiced without some or all of these specific details.

Example embodiments relate to methods and systems for data storage, particularly in the context of databases. In this context, a database is an organized collection of data which is stored and may be accessed electronically. This accessing may be achieved by means of a computer instruction comprising for example a query derived from a client which may relate to one or more of reading, writing, transforming or managing data.

Example embodiments particularly relate to database management, whereby methods and systems control how such queries are processed as above in an efficient manner. Example embodiments of this database management relate to a scalable, transactional database architecture which may be implemented on one or more computer systems, i.e. using a distributed model. However, other embodiments are not limited to this form of database model.

Example embodiments may provide a database management method and system that interacts with a key-value database which employs key-value pairs acting as a form of dictionary or hash table. The database values may comprise one or more files, objects or records (hereafter "files") which are stored in a location on a memory of the database, and each value is paired with a key usable to retrieve or transform the value, which key can be referred to in the query to access the respective value. Key-value pair databases are more flexible and scalable than their relational database counterparts, and tend to use far less memory to store the database, offering performance gains for certain workloads.

Example embodiments may provide a database management method and system that interacts with the key-value database via a transactional layer, being a hardware and/or software module that provides transactions, supporting the rolling-back or undoing of transactions if not completed appropriately, and in particular interacts with a transactional table or other similar data structure.

Example embodiments may provide a database management method and system that manages historical versions of cells of the key-value database in an efficient manner, in particular by performance of a targeted sweep of the key-value database. An advantage of certain example embodiments is to reduce known issues with previous sweep approaches, for example, by decreasing the time taken to perform a sweep and therefore increasing efficiency. Database performance may therefore be improved by the targeted sweeping or removal of historical cell versions.

Example embodiments may provide a database management method and system in the form of an application, which may be a microservice, that is, a lightweight application having a particular database-related function. Such an application may interact with other applications to provide overall functionality. For example, in an embodiment, a network of applications may be provided on a network for performing respective dedicated functions or groups of functions for clients using a database. For example, one such application may be dedicated to authentication and authorisation, to determine if a user is an authentic user for the purposes of using other applications and/or accessing the database, and authorised to access particular files or groups of files referred to in a query. Another such application may be a data integration service that provides sourcing, fusing and transforming of data into a required format. Another such application may be a version control service. Numerous other examples may be imagined.

In general, an application may be considered an application dedicated to a particular service or services associated with database data, and users may utilise said applications via a client and network to interact with the database data, either directly or via the network applications, in a flexible and useful way.

Example Computer System

FIG. 1 illustrates an example of a computer system 100 configured to perform method and systems described herein. As shown, the computer system 100 includes a client computing device 112 used by a human user 110, a server 130 and one or more memory devices that may provide individual databases 140-1, 140-2, 140-3 or a distributed database. The client computing device 112 and the server 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of a basic computing device 500 described below with respect to FIG. 10. The client computing device 112 may also include a web browser or a client application configured to display, in a graphical user interface 116 of the client computing device 112, a computer program for accessing data. It may also allow the user to specify other operations that should be performed by the sever 130. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server 130 may be implemented as a single server computing device or as multiple server computing devices arranged in a distributed or clustered computing arrangement. Each such server computing device may be composed of hardware components like those of basic computing device 500 described below with respect to FIG. 9. The server 130 includes a transaction manager 135 which may be an application, script or other executable file the operation of which will be described later on. In some embodiments, other software modules may be provided on the server 130.

The server 130 may include one or more processors (e.g. CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the transaction manager 135.

One or more applications 122-1, 122-2, 122-3, 125 may be connected to the network 120 for performing one or more functions associated with data in the databases 140-1, 140-2, 140-3. The one or more applications 122-1, 122-2, 122-3, 125 may be microservices, or similar applications dedicated to a particular service or services associated with database data, and users may utilise said applications via a client and network to interact with the database data in a flexible and useful way.

For example, a first application 122-1 may be configured for performing user authentication and authorisation. A second application 122-2 may be configured for performing data integration for one or more of sourcing, fusing and transforming data in the one or more databases 140-1, 140-2, 140-3 into a required format. A third microservice 122-3 may be configured for performing a further database-related task. The user 110 wishing to perform some task or query on data in the one or more databases 140-1, 140-2, 140-3 may utilise the first to third applications 122-1, 122-2, 122-3. This use may be restricted to particular users, for example by initially requiring tasks or queries to use the first application 122-1 for user authentication and authorization, prior to enabling use of the other applications 122-2, 122-3.

The transaction manager 135 is configured to manage transactions. A transaction is a unit of work, i.e. one or more of an update, read, deletion, transformation and write operation (or command), to be performed by a data management system in response to user requests. The data contained in a transaction may correspond to a portion of a data object, a single data object or a plurality of data objects. For example, the data management system may be a system comprising the server 130 and the one or more databases 140-1, 140-2, 140-3. While the one or more individual databases 140-1, 140-2, 140-3 can provide transactions, using the transaction manager 135 enables transactions to be implemented across a distributed database system which is provided over plural machines or locations. Transaction manager 134 may be a hardware or a software module which implements a transactional layer.

Transactions enable roll-back, or recovery or undoing, from failures by ensuring that the data management system is kept consistent when failures occur. Transactions also ensure the data management system is kept consistent when multiple programs attempt to access the data management system simultaneously. This is achieved by four properties of transactions known as ACID: Atomicity, Consistency, Isolation and Durability.

Atomicity refers to transactions being "all-or-nothing", or atomic, meaning that a transaction either completely succeeds or fails. If a transaction succeeds, all operations included in the transaction are completed. If a transaction fails, no visible change is made to the data management system, so it appears to external systems, such as the client 112, accessing the system after the transaction has failed that no operation has been attempted. Transaction failure may occur for a number of reasons, e.g. power failure, faulty code or application failure.

Consistency refers to (successful) transactions only changing data stored by the data management system in allowed ways. The allowed ways that the database can change may be constrained by any number of primary key constraints, data type constraints, foreign key constraints, unique constraints and assertion statements. If a transaction results in a state that violates any of these constraints, the transaction is not successful and results in a transaction failure, so it is as if no operation has been attempted.

Isolation refers to work taking place inside a transaction being invisible to other operations, i.e. other transactions, running concurrently. This property ensures data is only seen in a consistent state, i.e. before or after a transaction has completed. Without isolation, data read by a second transaction while a first transaction was underway would be incorrect. For example, the first transaction may represent a bank transfer and so increment one bank balance then decrement another bank balance. If a second transaction was able to read these bank balances half-way through the first transaction, the first bank balance would be incremented but the second bank balance would not yet be decremented. It would, therefore, appear to the second transaction that money had appeared from nowhere. Isolation prevents these scenarios from occurring.

Durability refers to all successful transactions being permanently stored, i.e. stored in non-volatile memory, e.g. to a hard disk drive or solid state drive. The transaction is not considered successful until this has occurred, and if this is prevented from occurring, e.g. by a disk failure, the transaction is deemed to have failed, and no visible change is made to the data management system.

Each of the one or more databases 140-1, 140-2, 140-3 may include one or more processors (e.g., CPUs), a network interface, and memory. The processor(s) may be configured to execute computer instructions that are stored in one or more computer-readable media, for example, a memory of each database. The databases 140-1, 140-2, 140-3 may each include a network interface configured to allow each database 140-1, 140-2, 140-3 to transmit and receive data in one or more networks, e.g., a network connecting the server 130 and the databases, which may be the same or different network as the network that connects the server 130 and the client 112. The network interface may include one or more network interface cards (NICs). The memory of each database 140-1, 140-2, 140-3 may store data or instructions. The instructions stored in each memory may include a database server module 142-1, 142-2, 142-3. While three databases 140-1, 140-2, 140-3 are shown, any number of databases and database server modules may be used 142-1, 142-2, 142-3.

The database servers 142-1, 142-2, 142-3 may be any database serving application capable of providing reliable storage. In many embodiments, the database servers 142-1, 142-2, 142-3 are the same database serving application, but this is not essential provided all can be accessed and managed by the transaction manager 135. One or more of the database servers 142-1, 142-2, 142-3 is a key-value store 143 or key-value database, such as Apache Cassandra, Oracle NoSQL or LevelDB, which can be interacted with using a transactional layer, implemented by the transaction manager 135. One or more of the other database servers 142-1, 142-2, 142-3 may be a document-oriented database, such as MongoDB or CouchDB. One or more of the other database servers 142 may be a Structured Query Language (SQL) database such as Oracle® database, MySQL database, PostgreSQL database or Microsoft® SQL server.

In many embodiments, the database servers 142-1, 142-2, 142-3 are distributed database serving applications, e.g. Apache Cassandra or MongoDB, where at least one of the database servers is a key-value store 143 or key-value database. This is not as essential as distributed data management may be provided by the transaction manger 135. However, using a distributed database serving application enables fault tolerance and/or horizontal scalability, and the transaction manager 135 need only provide the distributed transaction functionality.

Figure 2:
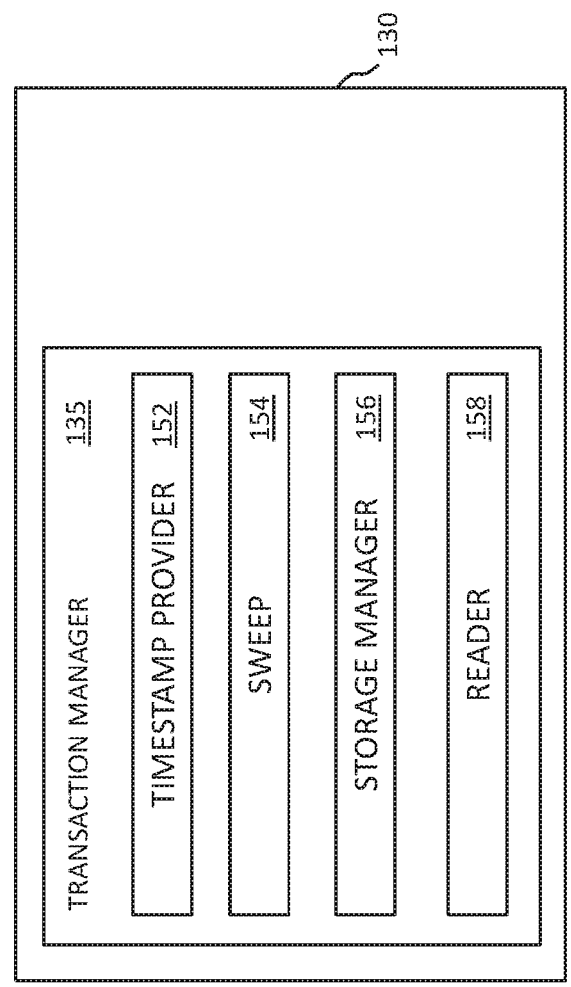
FIG. 2 is a schematic block diagram of a transaction manager of a computer system according to an example embodiment.

FIG. 2 is a schematic diagram of the transaction manager 135 provided on the server 130. The transaction manager 135 may be an application, script or other executable file. The transaction manager 135 comprises modules including a timestamp provider 152, a sweep module 154, a storage manager module 156 and reader module 158. It will be appreciated that two or more modules may be provided as a combined application, script or executable file.

The timestamp provider 152 provides timestamps (Ts) corresponding to start transactions and timestamps (Tc) corresponding to commit transactions, assuming the relevant transaction is successful (i.e. is committed and the write commands or operations persisted to the database). The provided time stamp may be an increasing number, so that a first timestamp may be 1 and a second timestamp may be 2 and so on, although the numbers need not be sequential. A commit timestamp (Tc) will have a higher number than its corresponding start timestamp (Ts) for obvious reasons. In some embodiments, timestamps Ts may come from an external source of timestamps.

The sweep module 154 processes write commands of a transaction before a write transaction is committed to a database 140-1 having a key value store 143, and before each of one or more write commands of the write transaction are persisted to the key value store 143, in accordance with example embodiments to be explained below. The sweep module 154 is further arranged to control one or more modules of transaction manager 135 to perform a targeted sweep of the key-value store 143, in accordance with example embodiments to be explained below.

The storage manager module 156 stores a value representing timestamps in an appropriate partition of physical memory. The storage manager module 156 also stores, in an appropriate partition of physical memory, a targeted sweep queue derived from the processing of the write commands by the sweep module 154. The physical memory may be one or more of the databases 142-1, 142-2, 142-3 or another memory. We refer herein to partitions, and it will be appreciated that partitions may refer to physically distinct portions of memory, such as different partitions on a hard disk drive, or on solid state memory, or physically different memory devices, or even physically different and remote locations, e.g. different network storage nodes or clusters.

The reader module 158 handles the reading of data from the appropriate partitions of physical memory, i.e. to determine the commit timestamp (Tc), if present, and what it is (if required), and the reading of data from the sweep module 154, including reading of one or more parts of the targeted sweep queue and one or more cells of the key-value store, as required.

Figures 3, 4:
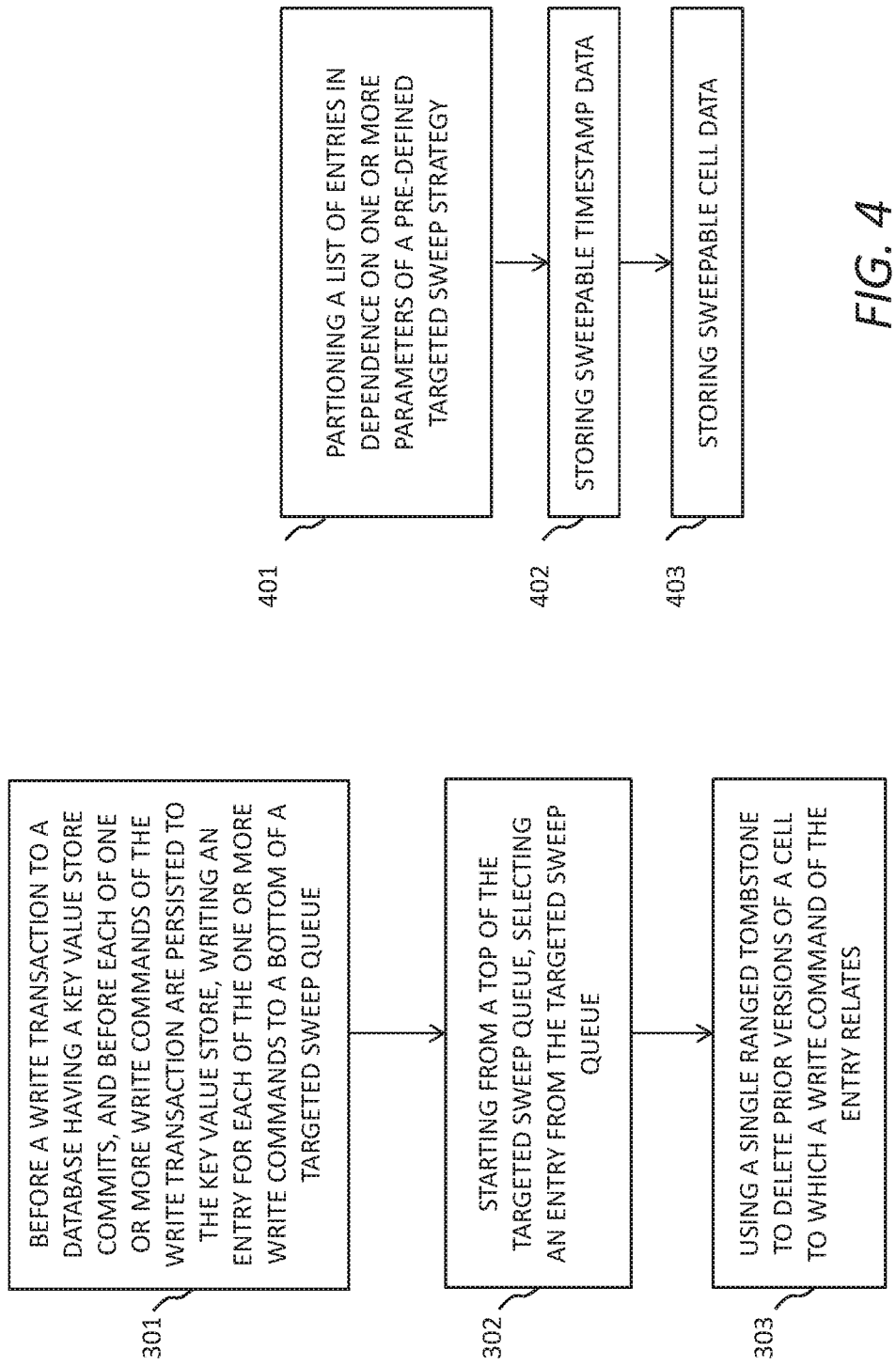
FIG. 3 is a flow diagram indicating processing operations of an example embodiment.
FIG. 4 is a flow diagram indicating processing operations of another example embodiment.

FIG. 3 is a flow diagram illustrating example operations that may be performed at the sweep module 154 of transaction manager 135 in accordance with example embodiments. Some operations may be omitted and some other operations may be added. The numbering of operations is not necessarily indicative of the order of processing.

A first operation 301 comprises, before a write transaction to a database 140-1 having a key value store 143 commits, and before each of one or more write commands of the write transaction are persisted to the key value store, writing an entry for each of the one or more write commands to a bottom, or end, of a targeted sweep queue. Operation 901 may be performed in response to receiving a database instruction. The targeted sweep queue can be stored in physical memory by the storage manager module 156, and any new entries added to the end of the targeted sweep queue by the storage manager module 156.

Each entry comprises metadata including: data identifying a cell to which the specific write command relates, a start timestamp of the write transaction, and information identifying a type of the write transaction. This metadata can be written to the targeted sweep queue in accordance with example embodiments to be explained below.

Another operation 202 comprises, starting from a start (or a top) of the targeted sweep queue, selecting an entry from the targeted sweep queue. The reader module 158 can read the targeted sweep queue stored by the storage manager module 156 to provide the selected entry to the sweep module 154.

Another operation 203 comprises using a single ranged tombstone to delete prior versions of a cell to which a write command of the selected entry relates. The storage manager module 156 can control overwriting of prior versions of the cell of key-value store 143 of database 140-1 which corresponds to the selected entry with a single ranged tombstone on instructions from the sweep module 154.

A tombstone is a special value indicating a deleted record, which typically takes the place of previous versions of the cell and indicates to other database storage nodes which implement a distributed database that the delete was intentional, and not due to an incomplete write, for example. If the cell containing a tombstone is called by an application, for example 122-1, a NULL value is then provided to indicate the cell has been deleted. A single ranged tombstone can be inserted to replace a specified timestamp range of historical cell versions, where the timestamp range of the single ranged tombstone can be determined by the sweep module.

Operations 202 and 203 together comprise performing a targeted sweep of the key-value database. Operations 202 and 203 may be performed at any suitable time. The targeted sweep may be initiated manually or automatically, for example based on a pre-determined or user-defined schedule.

FIG. 4 is a flow diagram illustrating example operations that may be performed at the storage manager module 156 of the transaction manager 135 to store the targeted sweep queue in accordance with example embodiments. For example, the following operations may comprise the operations for performing operation 301 of writing an entry for each of the one or more write commands to an end of a targeted sweep queue. Some operations may be omitted and some other operations may be added. The numbering of operations is not necessarily indicative of the order of processing.

A first operation 401 comprises partitioning a list of entries, each entry corresponding to a write command of a write transaction, where the partitioning is done in dependence on one or more parameters of a pre-defined targeted sweep strategy. The pre-defined targeted sweep strategy can be defined by the sweep module 154. The parameters can comprise one or more of a sweep strategy or a number of shards, as will be explained below in more detail.

Another operation 402 comprises storing (in the appropriate partition of the physical memory), as sweepable timestamp data, values representing a fine partition timestamp derived from a start timestamp of a write transaction. The sweepable timestamp data forms part of the targeted sweep queue. The start timestamp can be received from timestamp provider module 152. The fine partition timestamp may be indexed by the one or more parameters and by a coarse partition timestamp derived from the start timestamp of the write transaction.

Another operation 403 comprises storing (in the appropriate partition of the physical memory), as sweepable cell data, values representing the metadata for each entry within the partition. The sweepable cell data forms part of the targeted sweep queue. The metadata may be indexed by the one or more parameters and by the fine partition timestamp.

The targeted sweep queue stored in operations 401 to 403 may then be read by the reader module 158 on instruction from the sweep module 154 in order to perform a targeted sweep process in accordance with operations 301 to 303. In this respect, it is useful to consider an example.

We first introduce some definitions specific to these embodiments:

- A "start timestamp" is the start timestamp for a transaction comprising one or more write commands. This can be acquired from the timestamp provider module 152.
- A "commit timestamp" is the time at which the transaction comprising the one or more write commands commits. This can be acquired from the timestamp provider module 152. If the transaction has not committed, there is no commit timestamp.
- A "fine timestamp partition" is a timestamp divided by a first pre-determined value using integer division. In the following example, the first pre-determined value is 50,000, but any other suitable value may be used, depending on the application of the targeted sweep.
- A "coarse timestamp partition" is a timestamp divided by a second pre-determined value using integer division. The second pre-determined value is greater than the first pre-determined value. In the following example, the first pre-determined value is 10,00,000 (10 million), but any other suitable value may be used, depending on the application of the targeted sweep, for example, 100,000,000 (100 million).
- A "sweep strategy" or "strategy" is a table or database level property specifying how the sweep timestamp is to be calculated, and how the targeted sweep method is to be implemented. In the following example, two different sweep strategies will be described: conservative (allows read-only transactions) and thorough (does not allow read-only transactions).
- A "sweep timestamp", or "current sweep timestamp", is the timestamp acquired for a current sweep operation. This can be acquired via the reader module 158. The sweep timestamp is determined in dependence on the sweep strategy. For a conversative sweep strategy, the sweep timestamp is the lower of a start timestamp of a longest running write transaction (nothing before that timestamp should change) or an earliest readable time (no read transaction can see any data with a timestamp earlier than that time). For a thorough sweep strategy, the sweep timestamp is the start timestamp of the longest running write transaction (since there may be no read transactions).
- A "number of shards" is a user-definable number specifying how many different strands or partitions (shards) the write commands should be divided into to write the targeted sweep queue. The number of shards may be defined at a table or database level. Multiple shards may be implemented on one database storage node, or each shard may be distributed on a different node, for example.

Figures 5, 6:
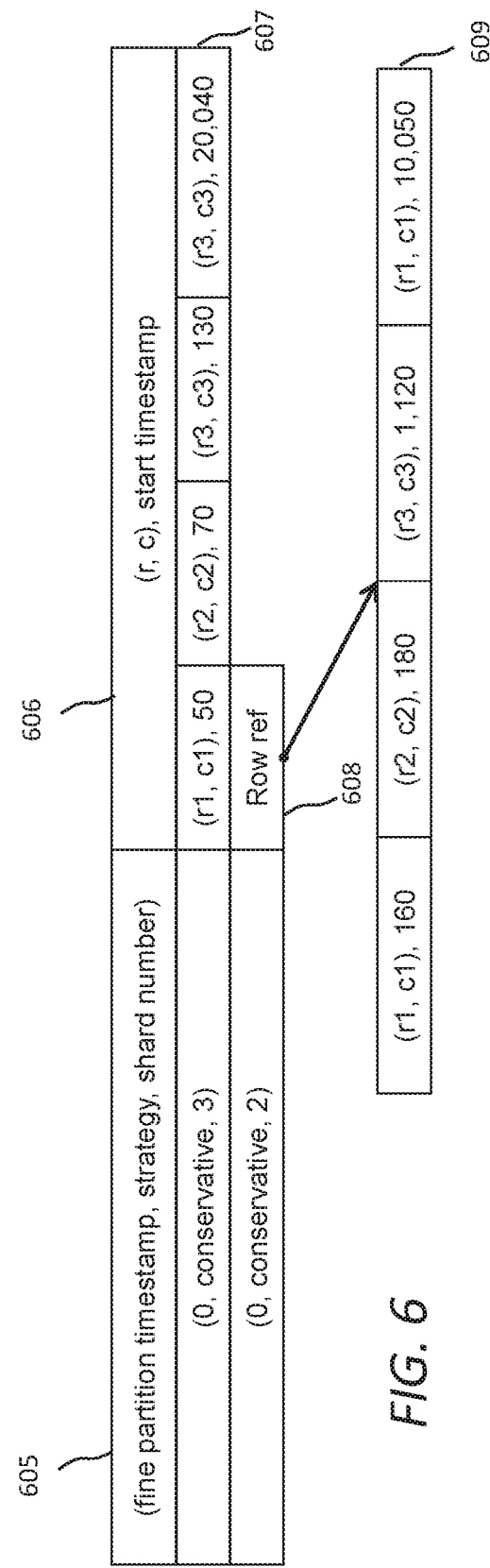
FIG. 5 is a schematic illustration of cell version history.
FIG. 6 is a schematic illustration of a part of a targeted sweep queue of an example embodiment.

FIG. 5 is a graphical example of versioning of a cell of a database as seen by a transaction manager such as transaction manager 135. The cell has the same row 501 and column 502 values (r1,c1) for each version of the cell, but a different timestamp 503 value—each row therefore represents a different version of the cell, with the final row 504 (in bold) being the most recent row (i.e. having the most recent timestamp). The historical versions (timestamp of 2 and 3) of this cell persist in the database in order to provide the database with its transactional functionality. However, to maintain the stability and performance of the database the historical versions need to be periodically removed. A function of the sweep module 154 is to sweep the key-value database and delete the previous versions of cells in a more targeted and efficient manner than previous sweep operations.

In particular, a function of the sweep module 154 is to process each write command within a transaction and then write an entry for each write command (the entry comprising metadata including data identifying a cell to which the write command relates, a start timestamp of the write transaction, and information identifying a type of the write transaction) to an end (i.e. to a back, or a bottom) of a targeted sweep queue using the storage manager module 156. The sweep module 154 then performs a targeted sweep of the database, starting from a start (i.e. a front or a top) of the targeted sweep queue, by selecting an entry from the targeted sweep queue based on a current sweep timestamp and using a single ranged tombstone to delete prior versions of a cell to which a write command of the entry relates.

It will be understood that entries from each write transaction can be written to the targeted sweep queue in order, i.e. that the earliest transactions are written to the queue first, before newer transactions are written to the targeted sweep queue. However, due to the method by which the sweep timestamp is calculated, the entries do not have to written in order; by the time sweep timestamp increases (bound by the start timestamp of the oldest, or longest-running, write transactions), all of the transactions that started before the new sweep timestamp will have written to the queue. The sweep module 154 then reads from a start of the queue, such that the older transactions are dealt with first. This can help ensure appropriate processing of the cells. To maintain transactional functionality, the sweep module 154 deletes any historical versions of the cell in question before removing the entry for that cell from the queue. In this way, if a node goes offline or the processing is somehow interrupted, the targeted sweep process can still be performed at a later time, and a cell will not be passed over due to its entry being deleted from the targeted sweep queue before the cell has been swept. Performance may therefore be improved.

In some example embodiments, entries can be written to the targeted sweep queue by distributing the data for the entries across one or more tables, or can be stored in the targeted sweep queue in any suitable form and format by the storage manager module 156. In this example, the targeted sweep queue is separated into tables, but it will be understood that the architecture of the target sweep queue can be altered from that described herein, or otherwise implemented in any suitable manner.

In one example embodiment, the storage manager module receives a list of the entries from the sweep module 154 and partitions the list of entries into one or more partitions in dependence on one or more parameters of a pre-defined targeted sweep strategy, where the sweep strategy can be received from the sweep module 154 or read from the database by the reader module 158. Any suitable parameters for partitioning the list of entries may be defined at a table or database level. In one example, sweep strategy is used as a parameter for partitioning the list of entries. By assigning entries based on sweep strategy, it may be easier to process each cell during the targeted sweep since the read/write conditions for the cell to which the entry relates are known.

In one example, the list of entries can be partitioned by the number of shards that the target sweep queue will use for the table or database. Shards split the targeted sweep queue into a number of disjointed, separate, queues; the use of shards (optionally a maximum of 256 shards) can enable better parallelisation of the targeted sweep process. Moreover, since entries close together may take up a similar portion of byte space, (e.g. be within the same partition which may refer to a memory or disk partition, the same database cluster, the same machine, etc.), this may result in congestion and performance degradation (e.g. if lots of simultaneous reads and writes are being made to the same partition). This situation may be referred to as hot-spotting. By assigning each entry based on a shard number (which can be derived from a hash of the entry metadata), hot-spotting can be reduced. The use of hash helps to further randomise the distribution of the entries across shards and so across nodes, which can further therefore reduce hot-spotting.

For each of the partitions, the metadata of the entries within the partition is stored as "sweepable cell data" by the storage manager module 156. The metadata is indexed by the parameters used to define the partition and by a fine partition timestamp of the start timestamp of the transaction. FIG. 6 is a graphical example of the sweepable cell data, where 605 represents the index and 606 represents the metadata (e.g. a reference to the cell, a start timestamp of the transaction, a type of write transaction, etc) for one or more write commands. For example, there may be four entries in a row for a given index 605 (see row 607), or the entry for a given index may be a reference 608 to a dedicated row of entries, such as dedicated row 609. Such dedicated rows can be stored separately, for example in another table.

Furthermore, the fine partition timestamp of the start timestamp of the write transaction is stored as "sweepable timestamp data" by the storage manager module 156. The fine partition timestamp is indexed by the parameters used to define the partition and by a coarse partition timestamp of the start timestamp of the write transaction. FIG. 7 is a graphical example of the sweepable timestamp data, where 710 represents the index and 711 represents the fine partition timestamp of the start timestamps of one or more write transactions for said index. For example, the first row of sweepable timestamp data (row 712) indicates that using the above first pre-determined value of 50,000 for the fine partitioning, there have been writes having index 710 at timestamps between 0-50 k (fine partition of 0), 50-100 k (fine partition of 1), 200-250 k (fine partition of 4), 250-300 k (fine partition of 5), and 350-400 k (fine partition of 7).

An example of selecting an entry from a targeted sweep queue for performing a targeted sweep of a cell will now be described with reference to FIG. 5 to FIG. 8. FIG. 8 illustrates progress of one or more previous sweeps, and in some examples may be stored as part of the targeted sweep queue, or may be stored as separate data by the storage manager module 156. If a targeted sweep has been previously performed, progress of the previous sweep process is stored as a "sweep progress timestamp" 814, which progress can be indexed 813 by sweep strategy and shard number, as appropriate, to provide an indication of the time stamp that each shard and strategy was previously swept to. If no targeted sweep has been performed, no data is stored and the first targeted sweep starts at a timestamp of 1 (see for example the bottom row of FIG. 8, which contains no data).

For a given shard number and sweep strategy (here, shard number 3 and conservative strategy), a targeted sweep is to be performed up to a current sweep timestamp; in this example, the current sweep timestamp is 20,050 (determined as described above in the definitions).

Firstly, the sweep progress for the defined sweep parameters (strategy and shard number) is determined from the sweep progress timestamp data—from FIG. 8, it can be seen that the last timestamp this shard number and strategy was swept to was timestamp of 100. The coarse partition timestamp for this last timestamp of 100 is therefore 0 (using the second pre-determined value of 10,00,000, as above). The fine partition timestamp for this last timestamp is also 0 (using the first pre-determined value of 50,000, as above)

Starting with a coarse partition timestamp of 0, the sweepable timestamp data (FIG. 7) can be checked for any rows having an index 710 which corresponds to a coarse partition timestamp of 0, a shard number of 3 and a conservative sweep strategy. It can be seen that row 712 matches this criterion. Since row 712 contains a fine partition timestamp of 0 (equal to the fine partition of the last swept timestamp currently being considered), this indicates that a write command was made for a cell within this time frame (i.e. within a timestamp of 0-50 k), and therefore that the cell may need to be swept in the current targeted sweep process. However, the metadata for the cell this write command relates to, and thus the cell reference to the cell which could be swept and the exact start timestamp of the write command transaction, is not known.

Starting with the fine partition timestamp of 0, determined from row 712 of the table in FIG. 7, the metadata for the cell in question can be found by searching through the sweepable cell data (see FIG. 6), which is indexed 605 by the fine partition timestamp and sweep parameters. Row 607 is the first row which satisfies the criteria of the current targeted sweep process (0, conservative, 3). The first two columns (timestamp of 50 and 70) have already been swept, since the last swept timestamp 814 is 100 in this example. Therefore, these cells can be ignored. However, the cells referenced in the third and fourth columns (r3, c3 timestamp of 130 and r3, c3 timestamp of 250) can be swept using the current sweep progress. The range of the single tombstone to be used in the process is defined by the start timestamps of each of the entries in the queue for the cells to be swept.

Entry r3, c3, 130 is the first entry (the oldest in the queue) and therefore is the first entry to be swept. After r3, c3 is swept, the entry for that cell can be deleted from row 607 (either actually deleted, for example using a tombstone, or logically marked for deletion) in order to delete or "pop" the entry from the targeted sweep queue, and the next entry for cell r3, c3, 250 selected. This process continues until the start timestamp of the entry under consideration, or its commit timestamp, is greater than the current sweep timestamp (it will be understood that write commands which have not yet been written should not be deleted from the targeted sweep queue, nor old versions of the related cells deleted until after the write commands have persisted). Targeted sweep process may then end, or may move on to a different shard/sweep parameter.

In more detail, the range of the single tombstone to be used in the sweep process can be defined by the start timestamps of each of the entries in the queue for the cells to be swept and the sweep strategy. Cell r3, c3, timestamp 130 follows a "conservative" approach, and so can be swept by writing a deletion sentinel to the cell and then using a single ranged tombstone to delete all prior versions of the cell, without deleting the deletion sentinel or the write at timestamp 130. In other words, the most recent version of the cell (timestamp 130) is retained and all versions with earlier timestamps are replaced by the single tombstone. A deletion sentinel is a marker, or flag, to tell any transactions that try to read the historic data that the data has been deleted (causing the read function to fail rather than display no data) and is used in read-only conservative strategies.

If cell r3, c3, timestamp 130 is swept using a thorough, instead of conservative, strategy, the range of the single ranged tombstone is further dependent on the type of write command for that cell. If the write command is a write to insert a tombstone (i.e. to delete the cell), then a single ranged tombstone is used to delete all previous versions of the cell, including the write at timestamp 130 (i.e. including the tombstone) and including any sentinel which may exist in the r3, c3 cell history. This helps improve performance of the database by requiring only a single tombstone for the cell to be stored. If the write command is not a tombstone (i.e. is a write command not a 'delete' command), then a single ranged tombstone is used to delete any sentinel and all previous versions of the cell except the most recent write; in other words, the write at timestamp 130 is retained but all versions of cell r3, c3 with earlier timestamps are replaced by the single tombstone.

Once the sweep process is completed for the stated sweep parameters, the stored sweep progress timestamp can be replaced with the current sweep timestamp—i.e. timestamp 100 in column 814 of FIG. 8 is replaced with timestamp 200,050. Any rows of the sweepable cell data which have been fully processed can also be deleted (if the row entries were not deleted one by one as the sweep process progresses along the targeted sweep queue). For example, row 607 will have been fully processed in the above-described targeted sweep, since the timestamp 20,040 is less than the current sweep timestamp of 200,050. Row 607 can then be deleted from the targeted sweep queue. This is an actual delete process (i.e. no tombstone is written to the cells or row).

In some example embodiments, efficiency of the sweep process may be improved by considering a batch of entries at once. For example, a batch of entries with a start timestamp between 100 (the last swept timestamp, as discussed above) and the current sweep timestamp of 200,050 can all be considered in a single process, rather than considering each entry individually.

In such an arrangement, selecting an entry from the start of the targeted sweep queue comprises selecting an entry from the identified batch of entries. In some example embodiments, the entries from the identified batch of entries are partitioned based on a cell to which a write command of each entry relates. With reference to the above described example, the batch of entries identified would be (r3, c3), 130 and (r3, c3), 20,040 which would be divided or partitioned into a single partition for cell r3, c3. If instead shard number 2 was under consideration and dedicated row 609 was selected from row reference 608 (see FIG. 6), three partitions would be present: (r1, c1), timestamp entries of 160 and 10,050; (r2, c2), timestamp 180; and (r3, c3), timestamp 1,120. Each partition can then be considered in turn.

For each partition, the greatest start timestamp for that cell is determined. For row 607, the greatest timestamp is 20,040 (which is greater than 130). A single ranged tombstone can then be formed based on the greatest determined start timestamp and used to delete prior versions of the cell. All previous write commands can be incorporated into the single ranged tombstone; in other words, separate sweep processes aren't required for timestamps 130 and 20,040, rather a single tombstone can be used to delete previous versions, including timestamp 130 and retain only the most recent (timestamp 20,040).

After the targeted sweep process is completed, the stored sweep progress timestamp, or last swept timestamp 814, can be updated. Generally, the last swept timestamp can be replaced with the current sweep timestamp. However, if no candidate row of the sweepable cell data was identified based on the fine partition timestamp and sweep parameters, the last swept timestamp is replaced with the current sweep timestamp−1 (minus one). If none of the timestamps of the entries considered (for example, the entries from the identified batch) were committed after the sweep timestamp, and all entries of the targeted sweep queue have been read up to the sweep timestamp, then the stored sweep progress timestamp can be updated to Ts−1 (where Ts is the minimum of the sweep timestamp and the next possible timestamp that could be written to the targeted sweep queue). This approach can help to ensure the last swept timestamp is a value which it can be guaranteed the key-value database has been swept to.

Figure 9:
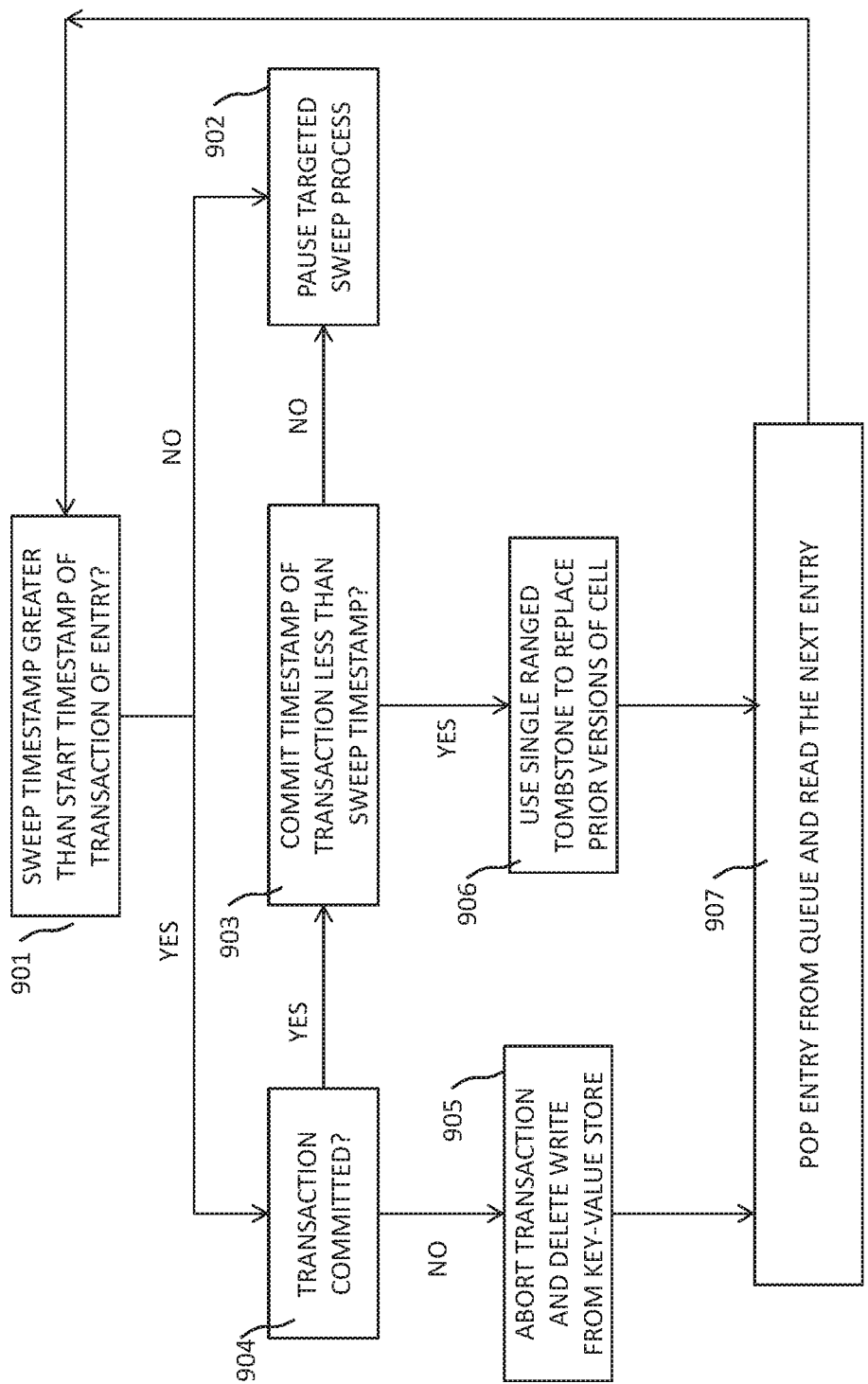
FIG. 9 is a flow diagram indicating processing operations of another example embodiment in response to receiving a database instruction.

FIG. 9 is a flow diagram illustrating example operations that may be performed at the sweep module 154 of the transaction manager 135 in accordance with example embodiments for performing a targeted sweep. Some operations may be omitted and some other operations may be added. The numbering of operations is not necessarily indicative of the order of processing.

A first operation 901 comprises checking whether the sweep timestamp of the sweep process is greater than a start timestamp of the transaction of the selected entry (for example, the entry selected in operation 302). If the sweep timestamp is less than or equal to the start timestamp, pause the targeted sweep process (operation 902) until a later period of time. Pausing can include stopping the sweep process for a given shard and starting a new sweep process for a different shard or sweep strategy, as discussed above.

Another operation 904 comprises checking whether the transaction of the selected entry has committed. If the transaction hasn't yet been committed (operation 904, "No") the transaction is aborted and the write deleted from the database (operation 905). Operation 905 can be performed on a cell of a single selected entry, or on an entry which is selected from a batch of entries as having the greatest timestamp. In such an arrangement, all writes in the batch that are referenced to from aborted transactions are deleted (a direct delete, not a ranged tombstone).

If the transaction has committed (operation 904, "Yes"), another operation 903 comprises checking whether the sweep timestamp of the sweep process is less than a commit timestamp of the transaction of the selected entry. In accordance with some example embodiments, the sweep manager 154 is configured to check a commit timestamp of the transaction to which the entry is associated using the reader module 158. If the commit timestamp is greater than or equal to the sweep timestamp (operation 903, "No"), pause the targeted sweep process (operation 902) until a later period of time. This can prevent entries being erroneously swept. For example, it allows enough time for another open write transaction, started after the start time of the transaction of the selected entry but before the transaction committed, to be processed, or (in the case of a conservative sweep strategy) enough real-world time to elapse to guarantee that no read-only transactions were started before the commit timestamp. Optionally, the period of time can be pre-determined or user defined, or can depend on a table or database level sweep strategy. Pausing can include stopping the sweep process for a given shard and starting a new sweep process for a different shard or sweep strategy, as discussed above.

Otherwise (operation 903, "Yes"), another operation 906 comprises using a single ranged tombstone, the range of which can be determined as described above to replace prior versions of the cell. Operation 906 can be performed on a cell of a single selected entry, or on an entry which is selected from a partitioned batch of entries as having the greatest timestamp.

Another operation 907 comprises popping the entry for which the cell was swept at operation 906 and reading the next entry from the targeted sweep queue. Popping the entry can comprise popping each entry of the batch of entries which relates to the swept cell; for example, an entire row of the table shown in FIG. 6 can be deleted using a single tombstone. Operation 901 can then be repeated with the next entry of the targeted sweep queue, until the sweep process is completed. In examples as described above, once the targeted sweep process is complete, the current timestamp is persisted into the targeted sweep queue in column 814 as the last swept timestamp for the appropriate index 813.

By sweeping cells in this way, historical versions of each cell can be deleted by targeting and sweeping only those cells of a database which have been written to in one or more previous write commands. Efficiency and speed may therefore be increased.

Example Computing Device

Figure 10:
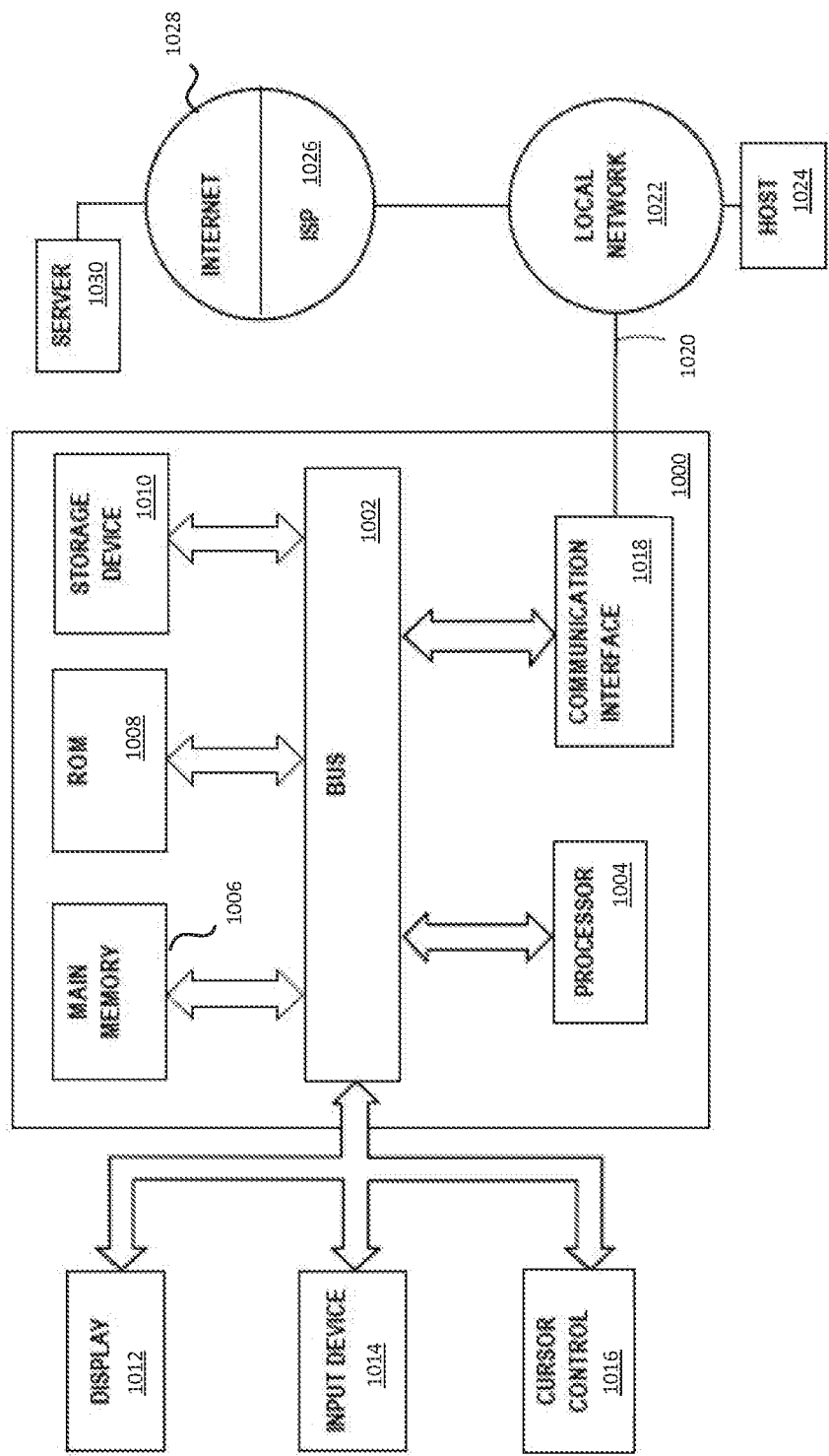
FIG. 10 is block diagram of a computing device that may be employed in the example embodiments.

Referring now to FIG. 10, it is a block diagram that illustrates a computing device 1000 in which software-implemented processes of the subject innovations may be embodied. Computing device 1000 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 1000 may include a bus 1002 or other communication mechanism for addressing main memory 1006 and for transferring data between and among the various components of device 1000.

Computing device 1000 may also include one or more hardware processors 1004 coupled with bus 1002 for processing information. A hardware processor 1004 may be a general purpose microprocessor, a system on a chip (SoC), or other processor suitable for implementing the subject innovations.

Main memory 1006, such as a random access memory (RAM) or other dynamic storage device, also may be coupled to bus 1002 for storing information and instructions to be executed by processor(s) 1004. Main memory 1006 also may be used for storing temporary variables or other intermediate information during execution of software instructions to be executed by processor(s) 1004.

Such software instructions, when stored in non-transitory storage media accessible to processor(s) 1004, render computing device 1000 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1000 also may include read only memory (ROM) 1008 or other static storage device coupled to bus 1002 for storing static information and instructions for processor(s) 1004.

One or more mass storage devices 1010 may be coupled to bus 1002 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 1002 to display 1012, such as a liquid crystal display (LCD) or other electronic visual display, for displaying information to a computer user. In some configurations, a touch sensitive surface incorporating touch detection technology (e.g., resistive, capacitive, etc.) may be overlaid on display 1012 to form a touch sensitive display for communicating touch gesture (e.g., finger or stylus) input to processor(s) 1004.

An input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in some configurations, such as the configuration depicted in FIG. 10, one or more of display 1012, input device 1014, and cursor control 1016 are external components (i.e., peripheral devices) of computing device 1000, some or all of display 1012, input device 514, and cursor control 1016 are integrated as part of the form factor of computing device 1000 in other configurations.

Functions of the disclosed systems, methods, and modules may be performed by computing device 1000 in response to processor(s) 1004 executing one or more programs of software instructions contained in main memory 1006. Such instructions may be read into main memory 1006 from another storage medium, such as storage device(s) 1010. Execution of the software program instructions contained in main memory 1006 cause processor(s) 1004 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor(s) 1004 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor(s) 1004 retrieves and executes the instructions. The instructions received by main memory 1006 may optionally be stored on storage device(s) 1010 either before or after execution by processor(s) 1004.

Computing device 1000 also may include one or more communication interface(s) 1018 coupled to bus 1002. A communication interface 1018 provides a two-way data communication coupling to a wired or wireless network link 1020 that is connected to a local network 1022 (e.g., Ethernet network, Wireless Local Area Network, cellular phone network, Bluetooth wireless network, or the like). Communication interface 1018 sends and receives electrical, electromagnetic, or optical signals that carry digital data streams representing various types of information. For example, communication interface 1018 may be a wired network interface card, a wireless network interface card with an integrated radio antenna, or a modem (e.g., ISDN, DSL, or cable modem).

Network link(s) 1020 typically provide data communication through one or more networks to other data devices. For example, a network link 1020 may provide a connection through a local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network(s) 1022 and Internet 1028 use electrical, electromagnetic or optical signals that carry digital data streams. The signals through the various networks and the signals on network link(s) 1020 and through communication interface(s) 1018, which carry the digital data to and from computing device 1000, are example forms of transmission media.

Computing device 1000 can send messages and receive data, including program code, through the network(s), network link(s) 1020 and communication interface(s) 1018. In the Internet example, a server 730 might transmit a requested code for an application program through Internet 1028, ISP 1026, local network(s) 1022 and communication interface(s) 1018.

The received code may be executed by processor 1004 as it is received, and/or stored in storage device 1010, or other non-volatile storage for later execution The above-described example computer hardware is presented for the purpose of illustrating certain underlying computer components that may be employed for implementing the subject innovations. This computer hardware, when executing software that causes the computer hardware to perform the various processes discussed herein, becomes a special purpose computer that performs particular useful applications.

The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A computer-implemented method comprising:
writing an entry for each of one or more write commands of a write transaction to an end of a targeted sweep queue in a database having a key value store,
the entry for each of the one or more write commands comprising metadata including: data identifying a cell to which the one or more write commands relate, a start timestamp of the write transaction, and information identifying a type of the write transaction wherein writing the entry for each of the one or more write commands to the end of the targeted, sweep queue comprises:
partitioning a list of entries dependent on one or more parameters of a pre-defined targeted sweep strategy;
storing, as sweepable timestamp data of the targeted sweep queue, a fine partition timestamp derived from the start timestamp of the write transaction; and
storing, as sweepable cell data of the targeted sweep queue, for each entry within the partition, the metadata for each entry; and
performing the targeted sweep of the database by:
starting from a start of the targeted sweep queue,
selecting an entry from the targeted sweep queue based on a current sweep timestamp, and
using a single ranged tombstone to delete prior versions of a cell to which a write command of the entry relates.

2. The computer-implemented method of claim 1, further comprising deleting the selected entry from the targeted sweep queue and selecting a next entry from the targeted sweep queue.

3. The computer-implemented method of claim 1, further comprising committing the write transaction to the database and persisting each of the one or more write commands to the key value store.

4. The computer-implemented method of claim 3, wherein performing the targeted sweep of the database comprises:
checking a commit timestamp of a write transaction associated with the write command of the entry; and
if the write transaction is not committed:
aborting the write transaction,
deleting the write command from the key value store,
popping the entry from the targeted sweep queue, and
selecting a next entry from the targeted sweep queue.

5. The computer-implemented method of claim 3, wherein performing the targeted sweep of the database comprises:
checking a commit timestamp of a write transaction associated with the write command of the entry; and
if the commit timestamp is greater than or equal to the current sweep timestamp, pausing the targeted sweep.

6. The computer-implemented method of claim 3, wherein performing the targeted sweep of the database comprises:
checking a commit timestamp of a write transaction associated with the write command of the entry; and
if the commit timestamp is less than the current sweep timestamp, using the single ranged tombstone to delete the prior versions of the cell.

7. The computer-implemented method of claim 1, wherein the pre-defined targeted sweep strategy comprises a conservative strategy and performing the targeted sweep of the database having the conservative strategy comprises:
writing a deletion sentinel; and
using the single ranged tombstone to delete the prior versions of the cell without deleting the deletion sentinel or the write command.

8. The computer-implemented method of claim 1, wherein the pre-defined targeted sweep strategy comprises a thorough strategy and performing the targeted sweep of the database having the thorough strategy comprises:
if the write command of the entry is a tombstone:
using the single ranged tombstone to delete the prior versions of the cell including any existing deletion sentinel and the write command.

9. The computer-implemented method of claim 1, wherein the pre-defined targeted sweep strategy comprises a thorough strategy and performing the targeted sweep of the database having the thorough strategy comprises:
if the write command of the entry is not a tombstone:
using the single ranged tombstone to delete the prior versions of the cell including any existing deletion sentinel without deleting the write command.

10. The computer-implemented method of claim 1, wherein performing the targeted sweep of the database further comprises:
when the current sweep timestamp is greater than a start timestamp of the entry, using the single ranged tombstone to delete the prior versions of the cell.

11. The computer-implemented method of claim 1, wherein performing the targeted sweep of the database further comprises:
when the current sweep timestamp is less than or equal to a start timestamp of the entry, pausing the targeted sweep.

12. The computer-implemented method of claim 1, wherein selecting the entry from the targeted sweep queue comprises:
selecting a stored sweep progress timestamp;
identifying a batch of entries from the targeted sweep queue having a first start timestamp greater than the stored sweep progress timestamp and a second start time less than the current sweep timestamp;
partitioning entries from the identified batch of entries based on a cell to which a write command of each entry relates; and
for each partition:
determining an entry having a greatest start timestamp of write transactions to the cell, and
determining the single ranged tombstone based on the greatest start timestamp.

13. The computer-implemented method of claim 12, further comprising, after performing the targeted sweep of the database, updating the stored sweep progress timestamp.

14. The computer-implemented method of claim 1, wherein the current sweep timestamp is lesser of: a start timestamp of a longest running write transaction and an earliest readable time.

15. The computer-implemented method of claim 1, wherein the fine partition timestamp comprises an integer division of the start timestamp by a first pre-determined value.

16. The computer-implemented method of claim 1, wherein the coarse partition timestamp comprises an integer division of the start timestamp by a second pre-determined value, the second pre-determined value greater than the first pre-determined value.

17. The computer-implemented method of claim 1, comprising, for each write command, determining a shared number from a hash identifying the cell.

18. The computer-implemented method of claim 1, wherein the fine partition timestamp is indexed by the one or more parameters and by a coarse partition timestamp derived from the start timestamp of the write transaction, and wherein the metadata is indexed by the one or more parameters and by the fine partition timestamp.

19. A non-transitory computer-readable storage medium including instructions that, when executed by at least one processor of a computing system, cause the computing system to perform a method comprising:
  writing an entry for each of one or more write commands of a write transaction to an end of a targeted sweep queue in a database having a key value store,
  the entry for each of the one or more write commands comprising metadata including: data identifying a cell to which the one or more write commands relate, a start timestamp of the write transaction, and information identifying a type of the write transaction, wherein writing the entry for each of the one or more write commands to the end of the targeted sweep queue comprises:
    partitioning a list of entries dependent on one or more parameters of a pre-defined targeted sweep strategy;
    storing, as sweepable timestamp data of the targeted sweep queue, a fine partition timestamp derived from the start timestamp of the write transaction; and
    storing, as sweepable cell data of the targeted sweep queue, for each entry within the partition, the metadata for each entry; and
  performing the targeted sweep of the database by:
    starting from a start of the targeted sweep queue,
    selecting an entry from the targeted sweep queue based on a current sweep timestamp, and
    using a single ranged tombstone to delete prior versions of a cell to which a write command of the entry relates.

20. A system comprising:
one or more physical processors;
a memory storing instructions that, when executed by the one or more physical processors, cause the system to perform a method comprising:
  writing an entry for each of one or more write commands of a write transaction to an end of a targeted sweep queue in a database having a key value store,
  the entry for each of the one or more write commands comprising metadata including: data identifying a cell to which the one or more write commands relate, a start timestamp of the write transaction, and information identifying a type of the write transaction, wherein writing the entry for each of the one or more write commands to the end of the targeted sweep queue comprises:
    partitioning a list of entries dependent on one or more parameters of a pre-defined targeted sweep strategy;
    storing, as sweepable timestamp data of the targeted sweep queue, a fine partition timestamp derived from the start timestamp of the write transaction; and
    storing, as sweepable cell data of the targeted sweep queue, for each entry within the partition, the metadata for each entry; and
  performing the targeted sweep of the database by:
    starting from a start of the targeted sweep queue,
    selecting an entry from the targeted sweep queue based on a current sweep timestamp, and
    using a single ranged tombstone to delete prior versions of a cell to which a write command of the entry relates.

\* \* \* \* \*